United States Patent
Mckinnon

(10) Patent No.: US 7,319,113 B2
(45) Date of Patent: Jan. 15, 2008

(54) SOLVENT-BASED RECOVERY AND RECYCLE OF POLYAMIDE MATERIAL

(75) Inventor: Michael Stephen Mckinnon, Brockville (CA)

(73) Assignee: E.I. du Pont de Nemours and Company, Wilmington, DE (US)

( * ) Notice: Subject to any disclaimer, the term of this patent is extended or adjusted under 35 U.S.C. 154(b) by 80 days.

(21) Appl. No.: 10/808,854

(22) Filed: Mar. 24, 2004

(65) Prior Publication Data

US 2004/0186190 A1  Sep. 23, 2004

Related U.S. Application Data

(63) Continuation of application No. 09/876,244, filed on Jun. 7, 2001, now abandoned.

(60) Provisional application No. 60/210,162, filed on Jun. 8, 2000.

(51) Int. Cl.
*C08J 11/04* (2006.01)

(52) U.S. Cl. ........................................ 521/49.8; 521/40

(58) Field of Classification Search .................. 521/40, 521/49.8
See application file for complete search history.

(56) References Cited

U.S. PATENT DOCUMENTS

| | | | |
|---|---|---|---|
| 2,348,751 A | 5/1944 | Peterson |
| 2,742,440 A | 4/1956 | Stott et al. |
| 2,840,606 A | 6/1958 | Miller |
| 2,872,420 A | 2/1959 | Kruyff |
| 3,006,867 A | 10/1961 | Simon |
| 3,223,731 A | 12/1965 | Thorbum |
| 3,609,127 A | 9/1971 | Matthews |
| 3,696,058 A | 10/1972 | Teti |
| 4,003,880 A | 1/1977 | Sidebotham |
| 4,003,881 A | 1/1977 | Sidebotham |
| 4,064,079 A | 12/1977 | Sidebotham |
| 4,118,187 A | 10/1978 | Sidebotham |
| 4,137,393 A | 1/1979 | Sidebotham |
| 4,146,704 A | 3/1979 | Seki et al. |
| 5,198,471 A | 3/1993 | Nauman |
| 5,241,006 A | 8/1993 | Iqbal |
| 5,278,282 A | 1/1994 | Nauman |
| 5,280,105 A | 1/1994 | Moran, Jr. |
| 5,342,854 A | 8/1994 | Serad |
| 5,430,068 A | 7/1995 | Subramanian |
| 5,536,831 A | 7/1996 | Kopietz |
| 5,681,952 A | 10/1997 | Sifniades |
| 5,840,773 A | 11/1998 | Booij et al. |
| 5,849,804 A | 12/1998 | Sarian et al. |
| 5,889,063 A | 3/1999 | Wertz |
| 5,898,063 A | 4/1999 | Stefandl |
| 5,929,234 A | 7/1999 | Sifniades |
| 5,932,724 A | 8/1999 | Sifniades |
| 6,020,486 A * | 2/2000 | Booij et al. ................. 540/540 |
| 6,036,726 A | 3/2000 | Yang et al. |
| 6,083,283 A | 7/2000 | Berkstresser, IV et al. |
| 6,342,555 B2 | 1/2002 | Sifniades |

FOREIGN PATENT DOCUMENTS

| | | |
|---|---|---|
| CA | 788 009 | 6/1968 |
| DE | 7994 | 10/1954 |
| DE | 43 09 427 | 7/1994 |
| DE | 44 21 239 | 12/1994 |
| EP | 0 603 434 A1 | 6/1994 |
| FR | 921 667 | 3/1963 |
| FR | 1 347 566 | 11/1963 |
| FR | 1 569 229 | 5/1969 |
| GB | 1 017 985 | 1/1966 |
| JP | 52 107047 | 9/1977 |
| JP | 52-113938 | 9/1977 |
| WO | WO 94/08942 | 4/1994 |

OTHER PUBLICATIONS

Derwent Abstract, De 44 21 239 A1, "Reprocesing High-Molecular Weight Poplyamide 6-Comprises Depolymerisation by Heating Under Pressure with Caprolactam and Water, Followed opt. by Repolymeisation at Elevated Tempt . . . ", EMS Inventa AG, 1995.

Derwetn Abtract, "Recovery of Polyamide From Polyamide-Containing Materials., e.g. Carpets . . . ", Fischer Ind. GMBH Karl, 1994.

Derwetn Abstract, JP 52-107047 "Fine Powdered Polyamide Resins-Produced by Dissolving in Wter-Containing Alcohols under High Pressure and Temperature, then Cooling", Maruki Shokai KK, 1993.

Derwent Abstract, Fr 1 569 229 "Removal of titanium Dioxide FromPolymers . . . ", VEB Chemiefaserwerk Schwarz Wilhelm, 1993.

* cited by examiner

*Primary Examiner*—Edward J. Cain

(57) ABSTRACT

A process is disclosed for recovering polyamide material from post-industrial and post-consumer products containing the polyamide material and insoluble materials. The process includes the steps of: (a) contacting the post-industrial and post-consumer products with a suitable solvent in a reactor; (b) dissolving and partially depolymerizing the polyamide material in the solvent to form a solution by operating the reactor at a predetermined temperature and pressure and for a time sufficient to decrease the average molecular weight of the depolymerized polyamide to less than 90% of the initial molecular weight; (c) separating the insoluble material from the solution; and (d) recovering the depolymerized polyamide from the separated solution. The process may also include the step of repolymerizing the depolymerized polyamide.

16 Claims, 1 Drawing Sheet

SOLVENT-BASED RECOVERY AND RECYCLE OF POLYAMIDE MATERIAL

CROSS REFERENCE TO RELATED APPLICATIONS

This application is a continuation of application No. 09/876,244, filed Jun. 7, 2001, now abandoned which claims priority of provisional application No. 60/210,162, filed Jun. 8, 2000.

FIELD OF THE INVENTION

This invention relates to a solvent-based process for the recovery and recycle of polyamide material from post-industrial and post-consumer products. In particular, this invention allows the separation of very small solid particles, such as $TiO_2$, from the polyamide material to be recycled.

BACKGROUND OF THE INVENTION

Aliphatic polyamides, particularly nylon 6 and nylon 66, are extensively used in a variety of industrial and consumer products such as carpets and automotive parts. In particular, carpets and automobile air bags contain large portions of polymers with a high polyamide content. Because of the great quantity of post-industrial and post-consumer nylon made available each year, these nylon products are ideal for recovery and recycle. Additionally, concerns over efficient resource utilization and environmental protection have created a need for the recovery and recycle of nylon from discarded post-industrial and post-consumer products.

Recycle processes are already used to recycle polyamide carpet waste in order to minimize the portion of the polyamide-containing carpet waste that has to be discarded. Mechanical means, such as grinding and crushing, are known means for separation of solid polyamide material from foreign materials such as carpet backing, etc. Mechanical separation yields a low grade recycled product with limited uses. In order to produce a high-quality recycled polyamide product, the process must remove impurities such as dyes, cotton thread, delusterants ($TiO_2$), dirt, and oil, among other things, that cannot be removed by mechanical means alone.

There are several available non-mechanical approaches to reclamation of polyamide from discarded polyamide-containing products by isolating the polymer. Polyamides such as nylon are soluble in selected solvents, and thus solution-based processes offer routes to the recycle and recovery of polyamides. Suitable solvents are polar and often reactive with the nylon. Many need to be handled with extreme caution for safety reasons. From a processing point of view, ideal solvents should have the following characteristics: environmental friendliness, cost-effectiveness, low toxicity, capability of dissolving polyamides at relatively low temperatures, and capability of inducing polyamide precipitation for subsequent separation from the solvent. As an additional consideration in solvent-based recycle and recovery of nylon, a single solvent system rather than a mixture or a solution is generally desired as a cost effective and easier to operate system. Certain polyols and carboxylic acids have many attributes of ideal solvents for polyamide recycle and recovery. However, polyols and carboxylic acids have not been attractive solvents because they are reactive with polyamides, and thereby have contributed to the degradation of molecular weight of the polyamide. In these prior art processes, slight losses in molecular weight have been tolerated, however, it has been thought that more significant degradation is to be avoided because recovered degraded polyamides are unsuitable for either extrusion purposes (e.g. fibers and films) or use as molding compounds.

U.S. Pat. No. 5,430,068 to Subramanian discloses a process to recover polyamides using anhydrous polyols or aliphatic carboxylic acids having from 2 to 6 carbon atoms as the solvent. The process also includes the step of rapidly quenching the polyamide solution with an additional quantity of solvent to avoid any significant degradation of the polyamide.

Other known solvent-based recycle and recovery processes use glycols as solvents, such as acetic acid and water, ethylene glycol and propylene glycol. Glycol-based solvent processes take advantage of the different solvencies of nylon 6 and nylon 66 at particular temperatures to separate one from the other. However, glycols also react with the polyamides, in this case to create higher molecular weight polyamides. Thus, the residence time, i.e. the time that the polyamide is contacted with the solvent must be short to avoid glycol reaction with the polyamide.

Aliphatic alcohols have been suggested for use as solvents in processes to recycle and recover polyamides. Methanol, in particular, has been shown to be useful in the separation of nylon 6 from nylon 66. Moreover, aliphatic alcohol solvents are effective under mild conditions, i.e. low temperature and short residence time.

U.S. Pat. No. 5,840,773 to Booij et al discloses a process to recover polyamides from carpet waste using an aliphatic alcohol as the solvent. The process conditions are such that "virtually no polyamide is decomposed" so that directly reusable polyamides are obtained from the process.

U.S. Pat. No. 6,036,726 to Yang et al also discloses a solvent-based process to recover polyamides. Under the conditions described, the molecular weight of the recovered polyamide is "substantially unchanged", making the polyamide readily available for re-use.

In these prior art processes, therefore, degradation and depolymerization of the polyamide is avoided so that the recovered polyamide can be readily and directly reused to make finished products. One drawback, however, is that the viscosity of the unchanged polyamide solution remains relatively high, making filtration with fine filters difficult. Smaller, finer particles, such as sub-micron $TiO_2$ particles, are difficult, if not impossible, to separate from the polyamide solution. Thus, because the polyamide itself remains non-degraded in the existing recycle and recovery processes, it is difficult to mechanically or chemically remove smaller impurities such as $TiO_2$, a delusterant, that may be part of post-industrial and post-consumer nylon products.

This problem is addressed by the present invention in which a solvent-based process is provided to recover polyamides from post-industrial and post-consumer products. The process of the present invention allows for the separation of $TiO_2$ and other fine insoluble particles by partially depolymerizing the polyamide to decrease its viscosity.

SUMMARY OF THE INVENTION

Accordingly, in one aspect of the present invention, there is provided a process for recovering polyamide material having an initial average molecular weight from post-industrial and post-consumer products containing the polyamide material and insoluble materials, the process comprising the steps of:

(a) contacting the post-industrial and post-consumer products with a suitable solvent in a reactor;

(b) dissolving and partially depolymerizing the polyamide material in the solvent to form a solution by operating the reactor at a predetermined temperature and pressure and for a time sufficient to decrease the average molecular weight of the depolymerized polyamide to less than 90% of the initial average molecular weight;

(c) separating the insoluble material from the solution; and (d) recovering the depolymerized polyamide from the separated solution.

In a second aspect of the present invention, the process further comprises the step of repolymerizing the depolymerized polyamide.

BRIEF DESCRIPTION OF THE DRAWINGS

The preferred embodiment of the process of the present invention is described with reference to the accompanying drawing in which.

DETAILED DESCRIPTION OF THE PREFERRED EMBODIMENTS

Figure 1:
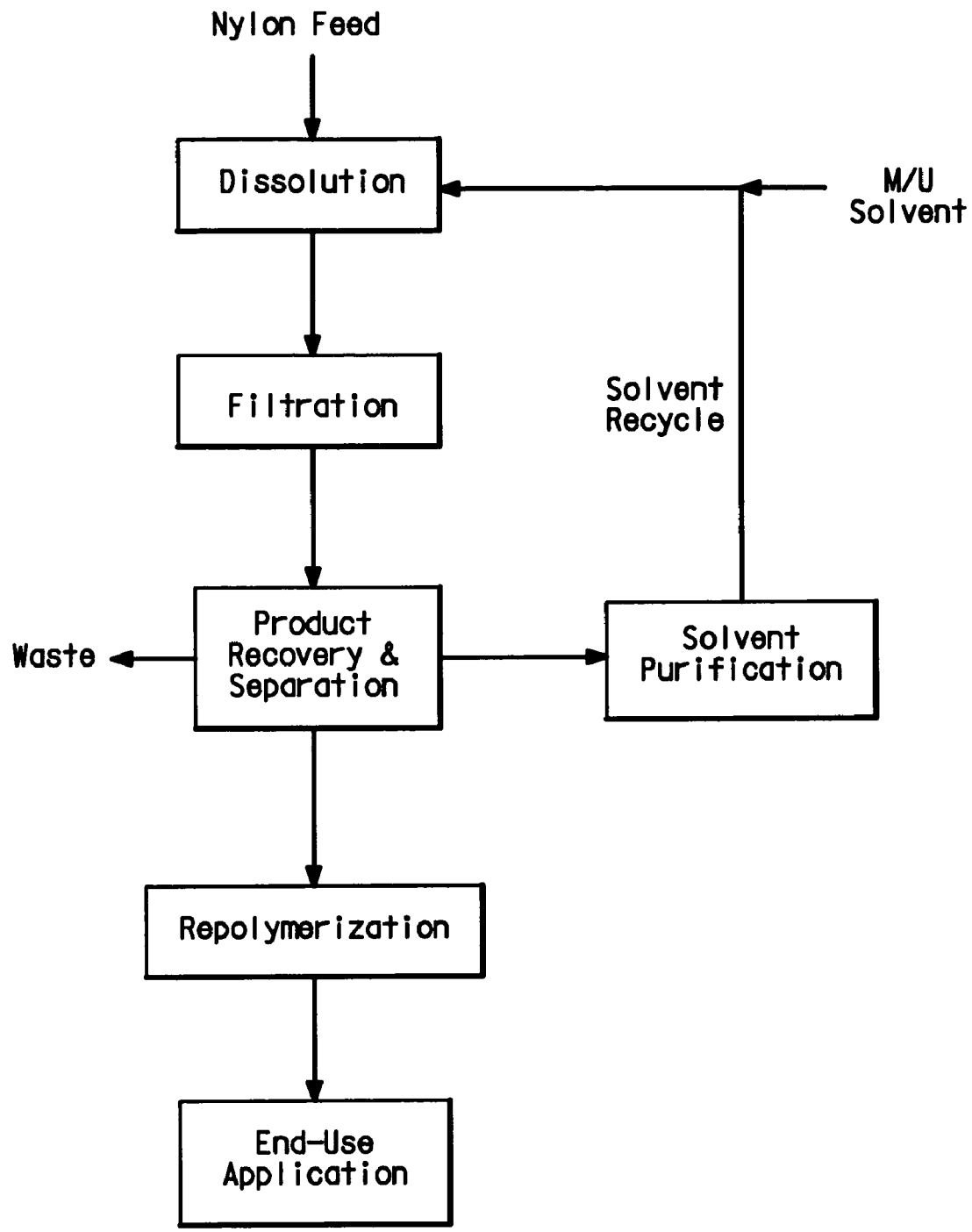
FIG. 1 is a flow chart illustrating the steps in the preferred embodiment of the process of the present invention.

The present invention will be described with reference to its preferred embodiment.

The preferred process illustrated in FIG. 1 comprises 5 main steps, although it will be understood by persons skilled in the art that Step 5 is a preferred step:

Step 1: Contacting the polyamide-containing post-industrial and post-consumer product with a suitable solvent.

Step 2: Dissolving and partial depolymerizing the polyamide in the solvent at a predetermined temperature and pressure for a time sufficient to decrease the average molecular weight of the polyamide to less that 90% of its original average molecular weight.

Step 3: Filtering the solution to remove solid impurities.

Step 4: Recovering the depolymerized polyamide from the solution.

Step 5: Repolymerizing the depolymerized polyamide so that it can be used to make other useful products.

In Step 1, nylon-containing post-industrial and post-consumer products are collected. The majority of recyclable nylon consists of nylon 6 and nylon 66 formed by the homopolymerization of 6-aminocaproic acid, also known as e-caprolactam. Nylon 66 also known as nylon 6,6, is the polyamide formed by the reaction of adipic acid with hexamethylenediamine. It will be understood, however, that the process of the present invention is not limited to nylon 6 and nylon 66, but also includes other polyamides such as nylon 610 and nylon 612.

Waste and scrap nylon 6 and nylon 66 are available from many sources including but not limited to rejects, turnings and trimmings from manufacturing processes, automotive parts, carpets, clothing, etc. The waste post-industrial and post-consumer products may be prepared for recycling by any method that produces particulate material such as grinding, crushing, etc. Alternately, if the source material is small enough, it may be used whole. Nylon fiber may be used as is or may also be ground into smaller pieces. Nylon fiber in carpets may be separated from the carpet backing, i.e. by shearing.

The nylon-containing products are then contacted with a suitable solvent capable of dissolving and depolymerizing nylon under predetermined conditions. The solvent used may be an aliphatic alcohol, such as ethanol or methanol. Preferably, methanol is used. The alcohol is preferably used in an anhydrous form, but it may also be in a solution of at least 90% by weight alcohol. Additionally, mixtures of ethanol, methanol or water may be used as the solvent, so long as the water content is no more than 10% by weight.

In Step 2, the polyamide is dissolved and partially depolymerized in the solvent in a reactor capable of operating at elevated temperatures and pressures. The temperature of the reactor is elevated and pressure is increased to maintain a liquid phase. Sufficient residence time is needed to allow sufficient depolymerization of the polyamide to occur. For the depolymerization of nylon 6 and nylon 66, the preferred temperature range is 160 to 210° C.; the preferred pressure range is 350 to 600 psig; and the residence time necessary for depolymerization ranges from about 30 to about 400 minutes. Under these controlled conditions, depolymerization of the polyamide reduces the average molecular weight of the polyamide from between about 10% to about 75%. This results in a decrease in the viscosity of the solution.

In Step 3, the solution containing the dissolved and depolymerized nylon and insoluble materials is passed through suitable filtration media to remove and separate the insoluble materials from the solution. Any suitable method of filtration maybe used. The preferred filtration method involves passing the dissolved and depolymerized nylon solution through glass fibers. In this preferred method, glass wool filtration involves passing the solution, under pressure of about 500 psig, through glass wool supported by wire mesh. Throughout this filtration step, all operating conditions including temperature, pressure and solvent concentration are maintained within the above-described ranges to keep the dissolved and depolymerized nylon in solution.

This filtration step separates insoluble material including sub-micron sized particulate matter such as $TiO_2$, from the solution. This results in a substantially more purified, low viscosity solution containing the depolymerized nylon. Because the nylon is not only dissolved but also depolymerized, much finer solid particles can be removed than would otherwise be possible with a solution containing large, intact higher viscosity nylon polymer. Finer filtration makes possible the removal of small sized impurities such as $TiO_2$ that are commonly found in nylon-containing products. In addition, because the nylon to be recyled is depolymerized, greater concentrations of nylon in solvent and longer residence times in the reactor are possible while still allowing for an acceptable recovered product. This is because the depolymerized nylon has a lower viscosity than that of the original, dissolved polymerized nylon.

In Step 4, the depolymerized nylon may be recovered by any recovery method known to persons skilled in the art, such as precipation of the depolymerized polyamides, spray drying, and flash evaporation. Preferably, the depolymerized nylon is precipitated out and removed from the filtered solution of Step 3 by either cooling the solution or diluting the solvent with an additive that forces the nylon out of solution, such as an anti-solvent agent. Once out of solution, the depolymerized nylon is separated from the solvent by filtration or centrifugation. Residual solvent must be removed from the depolymerized nylon before repolymerization. Removing nylon from the solvent in Step 4 produces both a reduced molecular weight (depolymerized) nylon and a solvent with soluble impurities therein. The solvent may be purified by existing technology and recycled back to Step 1 at the beginning of this process.

Repolymerization of the recovered polyamide is the final optional step in the process. Repolymerization begins with low-viscosity, low molecular weight polyamide and results in a higher viscosity, higher quality polyamide suitable for end-use processing. The repolymerization of nylon can be done readily by one of two standard methods: solid-phase repolymerization or melt-phase repolymerization. The choice of repolymerization method depends on the need for greater residence time, i.e. the time needed for repolymerization to occur.

The solid-phase method of repolymerizing nylon is carried out at any suitable temperature below the melting point of the polyamide. For Nylon 6, the upper temperature limit is 220° C. whereas for Nylon 66 it is 265° C. The preferred temperature range for solid-phase repolymerization is 160-200° C. Solid-phase repolymerization has no residence time limit, i.e. the repolymerization process may take as long as is needed, and therefore is useful for recovery of significantly depolymerized polyamides. Solid-phase repolymerization yields a high quality, high molecular weight polyamide.

In the melt-phase repolymerization method, the repolymerization occurs at a temperature above the melting temperature of the polyamide; the preferred temperature range of operation is 270-300° C. and the preferred residence time limit for repolymerization is 1-30 minutes. Melt-phase repolymerization is a faster, simpler process compared to solid-phase repolymerization and is useful if the final product to be made from the repolymerized polyamide is an extruded product.

Once repolymerization is complete, the recycled and recovered polyamide can be manufactured into nylon-containing industrial and consumer products.

EXAMPLES

Example 1

Nylon fibers were mechanically separated from carpet waste to produce a mixture containing 92% Nylon 66. The other 8% was a mixture of latex and polypropylene. 150 g of the separated Nylon fibers was then added to a one gallon stainless steel reactor equipped with an agitator. The reactor had a drain line on the bottom that was equipped with a shut-off valve and a metering valve. Prior to adding the nylon and solvent to the reactor, a wire mesh screen (80 mesh) and glass filters (Whatman type GF/D and GF/B) were placed on the bottom of the reactor and a metal ring was inserted to hold the filters in position. Approximately ½ inch of glass wool was placed on top of the filters. After adding the nylon to the top of the reactor system, the reactor was sealed and heated to 185° C. Two liters of methanol were pumped at a rate of 110 ml/min through a preheater and into the reactor. The system was then agitated and held at an operating temperature of 185° C. for 30 minutes. The shutoff valve was then opened on the drain line allowing the solution to flow through the filter system. The filtered solution flowed through the metering valve and into a product collection tank filled with an ice/water mixture, causing the nylon to precipitate. The precipitated nylon was separated from the solution with a wire mesh screen and removed to dry in a vacuum oven. The nylon product was analyzed by hydrolysis followed by gas chromatography for nylon content; molecular weight was determined by relative viscosity in 85% formic acid. The results are summarized in Table 1.

In this specification, relative viscosity is defined as the ratio of the viscosity of an 8.4% (by weight) solution of the polymer dissolved in 85% formic acid to the absolute viscosity of the 85% formic acid used. Polyamide from the product was weighed and dissolved in 85% formic acid. The viscosity was determined by automated measurement of the time required for the sample to flow through a calibrated Ubbelohde viscometer (drop time).

Methyl group occurrence per 106 gram of polyamide was used as an estimate of the occurrence of reaction between the solvent and the polymer. This shows the extent to which the solvent reacted with the polymer. This was measured by proton nuclear magnetic resonance.

Example 2

Example 2 was run at the same conditions as Example 1 except that the hold time in the reactor at operating conditions after solvent addition was 60 minutes. The results are summarized in Table 1

Example 3

Example 3 was run at the same conditions as Example 1 except that the hold time in the reactor at operating conditions after solvent addition was 120 minutes. The results are summarized in Table 1.

Example 4

Example 4 was run at the same conditions as Example 1 except 100 g of Nylon was initially added to the reactor and the hold time in the reactor after solvent addition was 180 minutes. The results are summarized in Table 1.

Example 5

Example 5 was run at the same conditions as Example 1 except 100 g of Nylon was initially added to the reactor, the operating temperature was 175° C., and the hold time in the reactor after solvent addition was 120 minutes. The results are summarized in Table 1.

Example 6

Example 6 was run at the same conditions as Example 1 except the product collected was placed in an oven that was nitrogen sparged for 170 minutes at 190° C. The results are summarized in Table 1.

Example 7

Example 7 was run at the same conditions as Example 1 except the product collected was placed in an oven that was nitrogen sparged for 340 minutes at 190° C. The results are summarized in Table 1.

TABLE 1

| Sample | Relative Viscosity | Methyl (eq/106 g) |
| --- | --- | --- |
| Feedstock | 50 | 0 |
| Example 1 | 32 | 53 |
| Example 2 | 27 | 72 |
| Example 3 | 20 | 85 |
| Example 4 | 19 | 111 |
| Example 5 | 21 | 111 |
| Example 6 | 60 | 24 |
| Example 7 | 72 | 34 |

Example 8

Example 8 was run using conditions similar to Example 1. The reactor system was modified with a second pressurized vessel for product collection. Once the solution was passed through the filters, it was collected in the second vessel and allowed to cool. Cooling was accomplished by flowing water through a cooling coil installed in the vessel. After cooling the precipitated polymer was separated from the solvent. Residual solvent was removed from the precipitated polymer by drying in a vacuum oven. The charge to the reactor was 200 grams and the operating temperature was 170° C. The hold time in the reactor after solvent addition was 30 minutes. The final product was analyzed for titanium dioxide content by neutron activation analysis. The results are summarized in Table 2 below.

Example 9

Example 9 was run under conditions identical to Example 8 except that the hold time in the reactor after solvent addition was 60 minutes. The results are also summarized in Table 2.

Example 10

Example 10 was run under conditions identical to Example 8 except that the hold time in the reactor after solvent addition was 90 minutes. The results are also summarized in Table 2.

TABLE 2

| Sample | Ti (neutron analysis) |
| --- | --- |
| Feedstock | 1400 ppm |
| Example 8 | 210 ppm |
| Example 9 | 145 ppm |
| Example 10 | 46 ppm |

Although the present invention has been shown and described with respect to its preferred embodiments, it will be understood by those skilled in the art that other changes, modifications, additions and omissions may be made without departing from the substance and the scope of the present invention as defined by the attached claims.

What is claimed is:

1. A process for recovering polyamide material having an initial average molecular weight from post-industrial and post-consumer products containing -polyamide material and insoluble materials, said process comprising the steps of:
   (a) contacting said the post-industrial and said post-consumer products with a suitable solvent in a reactor;
   (b) dissolving and partially depolymerizing said polyamide material in the said suitable solvent to form a solution by operating said the reactor at a predetermined temperature and pressure and for a time sufficient to decrease the average molecular weight of the partially depolymerized polyamide to between about 25% to about 90% of the initial average molecular weight of said polyamide material;
   (c) separating said insoluble material from said solution using filtration to produce a filtrate solution;
   (d) recovering the partially depolymerized polyamide from the filtrate solution of step (c) by adding an additive to the filtrate solution to precipitate the partially depolymerized polyamide material;
   (e) separating the precipitated partially depolymerized polyamide from the filtrate solution; and
   (f) repolymerizing the precipitated, partially depolymerized polyamide.

2. The process of claim 1, wherein the repolymerized polyamide has an average molecular weight substantially the same as the initial average molecular weight.

3. The process of claim 1, wherein the solvent is an aliphatic alcohol.

4. The process of claim 3, wherein the solvent is anhydrous methanol.

5. The process of claim 3, wherein the solvent is a solution containing at least 90% methanol.

6. The process of claim 3, wherein the solvent is anhydrous ethanol.

7. The process of claim 3, wherein the solvent is a solution containing at least 90% ethanol.

8. The process of claim 1, wherein the reactor is operated at a temperature between 160° C. and 210° C. and a pressure sufficient to keep the solvent in liquid phase for 30 to 400 minutes.

9. The process of claim 8, wherein the pressure is at least 350 psig.

10. The process of claim 1, wherein the repolymerization occurs through a solid-phase repolymerization process at a temperature between 160° C. and the temperature at which the polyamide melts.

11. The process of claim 1, wherein the repolymerization occurs through a melt-phase repolymerization process at a temperature above the melting temperature of the polyamide.

12. The process of claim 1, wherein filtration is accomplished using one or more filtration means which is selected from the group consisting of glass fibers, insoluble material residue and a combination thereof.

13. The process of claim 12, wherein the filtration means comprises insoluble material residue that has accumulated on the filtration means.

14. The process of claim 12, wherein the filtration means is glass fibers.

15. The process of claim 1, further comprising the step of purifying the separated solution after the depolymerized polyamide is recovered, and using the purified solution as the solvent in step (a).

16. The process of claim 1, wherein the post-industrial and post-consumer products include one or more of carpet waste, glass-reinforced nylon, air-intake manifolds, radiator end-caps, coated fabrics, air bag fabrics and mineral-filled nylon.

* * * * *